United States Patent
Kelley et al.

(10) Patent No.: US 9,300,857 B2
(45) Date of Patent: Mar. 29, 2016

(54) REAL-TIME SHARPENING OF RAW DIGITAL IMAGES

(71) Applicant: International Business Machines Corporation, Armonk, NY (US)

(72) Inventors: John F. Kelley, Clarkesville, GA (US); Stanley B. Lyzak, Jr., Orlando, FL (US); Kristin S. Moore, Atlanta, GA (US); Todd P. Seager, Orem, UT (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/248,396

(22) Filed: Apr. 9, 2014

(65) Prior Publication Data

US 2015/0296122 A1 Oct. 15, 2015

(51) Int. Cl.
*G06K 9/40* (2006.01)
*H04N 5/232* (2006.01)
*G06T 5/00* (2006.01)
*G06T 7/00* (2006.01)

(52) U.S. Cl.
CPC .............. *H04N 5/23212* (2013.01); *G06T 5/00* (2013.01); *G06T 7/0051* (2013.01)

(58) Field of Classification Search
CPC ... H04N 5/23212; H04N 13/007; G02B 7/38; G02B 7/36; G02B 27/0075; G02B 13/36; G06T 2207/0024; G06T 5/003; G06T 7/0051; G06T 5/00
USPC .................................................. 382/255, 263
See application file for complete search history.

(56) References Cited

U.S. PATENT DOCUMENTS

| 4,522,475 | A | | 6/1985 | Ganson |
|---|---|---|---|---|
| 5,307,170 | A | | 4/1994 | Itsumi et al. |
| 5,369,461 | A | * | 11/1994 | Hirasawa ........... H04N 5/23212 348/347 |
| 6,320,979 | B1 | | 11/2001 | Melen |
| 6,603,485 | B2 | | 8/2003 | Forman |
| 6,624,402 | B2 | | 9/2003 | Kaneko et al. |
| 6,801,717 | B1 | | 10/2004 | Hofer |

(Continued)

FOREIGN PATENT DOCUMENTS

| CN | 1926851 A | 3/2007 |
|---|---|---|
| CN | 102422630 A | 4/2012 |

(Continued)

OTHER PUBLICATIONS

Bargh, Peter, Focus Stacking—a macro photography technique, You Tube Video, retrieved on Dec. 10, 2013 from website: <https://www.youtube.com/watch?v=fJiEw4VCcYU>, 3 pages.

(Continued)

*Primary Examiner* — Kanjibhai Patel
(74) *Attorney, Agent, or Firm* — Nicholas L. Cadmus; Edward J. Wixted, III

(57) ABSTRACT

An approach for sharpening an image, a raw digitized image is provided. One or more processors receive a raw digitized image. One or more processors identify a first set of one or more focus points of the raw digitized image that are in focus, wherein the first set of one or more focus points are associated with a first area of the raw digitized image. One or more processors may cause a depth map, including the raw digitized image and a mask, to be displayed. One or more processors apply sharpening of a first sharpening strength to the first set of one or more focus points of the raw digitized image that are in focus.

17 Claims, 6 Drawing Sheets

(56) References Cited

U.S. PATENT DOCUMENTS

| | | | |
|---|---|---|---|
| 7,006,709 B2 | 2/2006 | Kang et al. | |
| 7,249,170 B2 | 7/2007 | Tindal et al. | |
| 7,398,434 B2 | 7/2008 | Auvenshine et al. | |
| 7,551,770 B2 | 6/2009 | Harman | |
| 7,676,559 B2 | 3/2010 | Cuervo | |
| 7,689,685 B2 | 3/2010 | Ahmed et al. | |
| 7,706,632 B2 | 4/2010 | Gouch | |
| 7,711,259 B2 | 5/2010 | Daley | |
| 7,747,067 B2 | 6/2010 | Popescu et al. | |
| 7,757,268 B2 | 7/2010 | Gupta et al. | |
| 7,962,445 B2 | 6/2011 | Auvenshine et al. | |
| 8,082,337 B1 | 12/2011 | Davis et al. | |
| 8,254,630 B2 | 8/2012 | Abe | |
| 8,406,548 B2 | 3/2013 | All et al. | |
| 8,432,434 B2 | 4/2013 | Veeraraghavan et al. | |
| 8,576,326 B2 * | 11/2013 | Kawamura | G02B 7/38 348/345 |
| 8,638,329 B2 | 1/2014 | Izumi | |
| 8,724,009 B2 * | 5/2014 | Tay | G06T 5/003 348/345 |
| 8,983,176 B2 | 3/2015 | Kelley et al. | |
| 9,076,204 B2 * | 7/2015 | Ogura | H04N 5/23212 |
| 9,196,027 B2 | 11/2015 | Brown et al. | |
| 2002/0041339 A1 | 4/2002 | Diepold | |
| 2004/0036923 A1 * | 2/2004 | Kokemohr | G06T 5/004 358/3.27 |
| 2005/0050193 A1 | 3/2005 | Edwiges et al. | |
| 2005/0157204 A1 | 7/2005 | Marks | |
| 2006/0072851 A1 | 4/2006 | Kang et al. | |
| 2006/0072852 A1 | 4/2006 | Kang et al. | |
| 2007/0053675 A1 | 3/2007 | Pollard | |
| 2007/0269119 A1 | 11/2007 | Hyerle et al. | |
| 2008/0031327 A1 | 2/2008 | Wang et al. | |
| 2008/0175576 A1 | 7/2008 | Hong et al. | |
| 2008/0309770 A1 | 12/2008 | Florea et al. | |
| 2010/0157127 A1 | 6/2010 | Takayanagi et al. | |
| 2010/0182495 A1 | 7/2010 | Murata | |
| 2010/0303373 A1 * | 12/2010 | Keelan | G02B 13/001 382/255 |
| 2011/0069884 A1 | 3/2011 | Zhang et al. | |
| 2011/0280475 A1 | 11/2011 | Singhal et al. | |
| 2011/0293137 A1 | 12/2011 | Gurman et al. | |
| 2012/0007940 A1 | 1/2012 | Michrowski et al. | |
| 2012/0007942 A1 | 1/2012 | Michrowski et al. | |
| 2012/0069222 A1 | 3/2012 | Steinberg et al. | |
| 2012/0070097 A1 * | 3/2012 | Adams, Jr. | H04N 5/23212 382/255 |
| 2012/0098947 A1 | 4/2012 | Wilkes | |
| 2012/0106937 A1 | 5/2012 | Molin et al. | |
| 2012/0133639 A1 | 5/2012 | Kopf et al. | |
| 2012/0169849 A1 | 7/2012 | Ferren | |
| 2012/0200726 A1 | 8/2012 | Bugnariu | |
| 2012/0242790 A1 | 9/2012 | Sandrew et al. | |
| 2013/0033582 A1 | 2/2013 | Sun et al. | |
| 2013/0094753 A1 | 4/2013 | Voss et al. | |
| 2013/0101206 A1 | 4/2013 | Dedeoglu et al. | |
| 2013/0113988 A1 | 5/2013 | Wajs | |
| 2013/0127823 A1 | 5/2013 | Diverdi et al. | |
| 2014/0086486 A1 * | 3/2014 | Pillman | G06T 5/003 382/173 |
| 2014/0184586 A1 | 7/2014 | Kelley et al. | |
| 2014/0185920 A1 | 7/2014 | Kelley et al. | |
| 2015/0154779 A1 | 6/2015 | Kelley et al. | |
| 2015/0278600 A1 | 10/2015 | Kelley et al. | |
| 2015/0279012 A1 | 10/2015 | Brown et al. | |

FOREIGN PATENT DOCUMENTS

| | | | |
|---|---|---|---|
| CN | 102842110 A | 12/2012 | |
| EP | 0751674 A2 | 1/1997 | |
| JP | 10-206150 | 8/1998 | |
| JP | 2007-128009 | 5/2007 | |
| JP | 2010041299 A | 2/2010 | |
| WO | 2009013682 A2 | 1/2009 | |
| WO | 2010145499 A1 | 12/2010 | |

OTHER PUBLICATIONS

Billiot et al., "3D Image Acquisition System Based on Shape From Focus Technique", Sensors, 2013, 13(4), pp. 5040-5053, <http://www.mdpi.com/1424-8220/13/4/5040>.

"About Bayesian Belief Networks", bnet. builder, Last updated: Apr. 22, 2008, Copyright © 2004, Charles River Analytics, Inc., pp. 1-14, <https://www.cra.com/pdf/BNetBuilderBackground.pdf>.

"Focus Stacking & Depth of Field", Cambridge in Coulour, Printed on: Jun. 29, 2015,© 2015, Cambridge in Coulour, pp. 1-9, <http://www.cambridgeincolour.com/tutorials/focus-stacking.htm>.

"Close up: Focusing Rails", EarthBound Light, Printed On: Jun. 29, 2015, Copyright © 2004, Bob Johnson, Earthbound Light, pp. 1-2, <http:www.earthboundlight.com/phototips/closeup-focusing-rail.html>.

Isidro,Raoul, "Nikon D5000 The Fun Guide", Raoul Isidro, retrieved on Sep. 5, 2013, pp. 1-13, <http://raoulisidro.com/page10.htm>.

Cutting, James E., "Representing motion in a static image: constraints and parallels in art, science, and popular culture", Perception, 2002, vol. 31, pp. 1165-1193.

Masuch et al., "Depicting Motion in Motionless Pictures", Speedlines, In: SIGGRAPH'99 Conference Abstracts and Applications, S. 277, ACM SIGGRAPH, 1999, 3 pages.

Ok et al., "The Design of Service Management System Based on Policy-based Network Management", Networking and Services, 2006. ICNS '06. International conference, Silicon Valley, CA, © 2006, IEEE, 6 pages,<http://ieeexplore.ieee.org/xpl/articleDetails.jsp?arnumber=1690530&queryText=The+Design+of+Service+Management+System+based+on+Policybased+Network+Management&newsearch=true&searchField=Search_All>.

"Focus Stacking Techniques for Extended Depth of Field", Spirit of Photography, retrieved on Sep. 5, 2013, pp. 1-14, <http://community.spiritofphotography.com/index.php?page=22>.

Spitzer, Jim, "What is a Redshift", YouTube video, uploaded on Nov. 27, 2006, retrieved on Mar. 17, 2014, pp. 1-3, <http://www.youtube.com/watch?v=FhfnqboacV0>.

Wesley, "The Nikon D800/E Autofocus Saga Continues", Nikon Fanboy, Aug. 22, 2012, Printed on: Jun. 29, 2015, pp. 1-6, <http://nikonfanboy.com/tag/asymmetric-focus>.

"Focus Stacking", Wikipedia, the free encyclopedia, last modified Nov. 9, 2013, retrieved on Mar. 31, 2014, pp. 1-3, <http://en.wikipedia.org/wiki/Focus_stacking>.

"Redshift", Wikipedia, the free encyclopedia, last modified on Mar. 12, 2014, retrieved on Mar. 17, 2014, pp. 1-11, <http://en.wikipedia.org/w/index.php?title=Redshift&printable=yes>.

U.S. Appl. No. 14/231,097, "Displaying Relative Motion of Objects in an Image", filed Mar. 31, 2014.

U.S. Appl. No. 14/231,281, "Automatic Focus Stacking of Captured Images", filed Mar. 3, 2014.

U.S. Appl. No. 14/588,476, "Automated Iterative Image-Masking Based on Imported Depth Information", filed Jan. 2, 2015.

Bigelow, "Sharpening in Photoshop—Part II", article retrieved on Apr. 3, 2014 from website: <http://www.ronbigelow.com/articles/sharpen2/sharpen2.htm>.

Bigelow, "Sharpening in Photoshop—Part V", article retrieved on Dec. 13, 2013 from website: <http://www.ronbigelow.com/articles/sharpen5/sharpen5.htm>.

Cambridge in Colour, "Guide to Image Sharpening", retrieved on Apr. 3, 2014 from website: <http://www.cambridgeincolour.com/tutorials/image-sharpening.htm>.

Cambridge in Colour, "Tutorials: Sharpness", retrieved on Dec. 13, 2013 from website: <http://www.cambridgeincolour.com/tutorials/sharpness.htm>.

Druchinin, "Anti-Aliasing / Low Pass Filter removal for sharper more detailed images", Life Pixel: Digital Infrared Conversion, Nov. 1, 2012, retrieved from website: <http://www.lifepixel.com/blog/anti-aliasing-low-pass-filter-removal>.

"Hyperfocal Distance Guide", Hyperfocal Distance; Printed: Oct. 23, 2012; Copyright: 2002 Don Fleming; <http://www.dofmaster.com/hyperfocal.html>.

(56) References Cited

OTHER PUBLICATIONS

Meunier et al., Radar image modeling: A 3D Spectral domain approach; 0-8194-2211-8/96, SPIE vol. 2823; pp. 149-159.

"pCam Film+Digital Calculator", Printed: Oct. 23, 2012; <http://www.davideubank.com/Good_Focus/pCAM_Film +Digital_Calculator.html>.

U.S. Appl. No. 13/732,562, entitled, "Image Selection and Masking Using Imported Depth Information", filed Jan. 2, 2013.

U.S. Appl. No. 13/732,577, entitled "Depth of Field Visulaization", filed Jan. 2, 2013.

"List of IBM Patents or Patent Applications Treated as Related".

* cited by examiner

REAL-TIME SHARPENING OF RAW DIGITAL IMAGES

TECHNICAL FIELD

The present invention relates generally to the field of digital image enhancement, and more particularly to sharpening raw digital images.

BACKGROUND

Sharpness is a term used to describe the clarity of detail in an image. Two fundamental factors that contribute to the perceived sharpness of an image are resolution and acutance. Resolution describes the ability of an image capturing device to resolve detail in the object that is being imaged. An image capturing device may include individual components, such as a lens and displaying components that contribute to the resolution of an image. In addition to the components, the environment in which the image is captured can also affect the resolution of the image.

Acutance describes how quickly image information transitions at an edge of an object within the image. An image with high acutance exhibits sharp transitions and clearly-defined borders. An image with low acutance exhibits soft transitions and a lack of clearly-defined borders. Acutance depends on both the quality of the lens of the image capturing device and the post-processing of the captured image. Acutance is typically the only aspect of sharpness that can be adjusted after an image is captured.

Image sharpening is a tool for emphasizing texture and directing viewer focus to an object in an image. Digital camera sensors and lenses oftentimes blur an image to some degree, and this blurring may require correction to enhance the clarity of the image. Image sharpening software sharpens an image by applying a sharpening mask. The use of layered sharpening masks provides a high degree of flexibility in sharpening. Once a layer is created, a sharpening mask can be applied, which sharpens the layer. Acutance can be enhanced during image sharpening.

SUMMARY

In one aspect, the present invention provides a method for sharpening an image. The method includes receiving a raw digitized image. The method further includes identifying, by one or more processors, a first set of one or more focus points of the raw digitized image that are in focus, wherein the first set of one or more focus points are associated with a first area comprising a first portion of the raw digitized image. The method further includes applying, by one or more processors, sharpening of a first sharpening strength to the first set of one or more focus points of the raw digitized image that are in focus.

In another aspect, the present invention provides a computer program product for sharpening an image. The computer program product includes receiving a raw digitized image. The computer program product further includes identifying, by one or more processors, a first set of one or more focus points of the raw digitized image that are in focus, wherein the first set of one or more focus points are associated with a first area comprising a first portion of the raw digitized image. The computer program product further includes applying, by one or more processors, sharpening of a first sharpening strength to the first set of one or more focus points of the raw digitized image that are in focus.

In yet another aspect, the present invention provides a computer system for sharpening an image. The computer system includes receiving a raw digitized image. The computer system further includes identifying, by one or more processors, a first set of one or more focus points of the raw digitized image that are in focus, wherein the first set of one or more focus points are associated with a first area comprising a first portion of the raw digitized image. The computer system further includes applying, by one or more processors, sharpening of a first sharpening strength to the first set of one or more focus points of the raw digitized image that are in focus.

In yet another aspect, the present invention provides a method for deploying a system for sharpening an image, comprising: providing a computer infrastructure being operable to: receive a raw digitized image; identify a first set of one or more focus points of the raw digitized image that are in focus, wherein the first set of one or more focus points are associated with a first area comprising a first portion of the raw digitized image; and apply sharpening of a first sharpening strength to the first set of one or more focus points of the raw digitized image that are in focus.

DETAILED DESCRIPTION

A raw image file contains minimally processed data from the image sensor of a digital image capturing device. Most raw digital images are not sharp, even when the lens is accurately focused. Raw images are often easier to edit during post-processing because they are more flexible than processed JPEG images, which have been compressed. Image sharpening algorithms can apply sharpening to all areas of the image. Sharpening masks can be used to sharpen specific areas of an image, but the method can be time consuming and typically must be performed during post-processing. Embodiments of the present invention perform real-time sharpness correction of a captured raw digital image.

Figure 1:
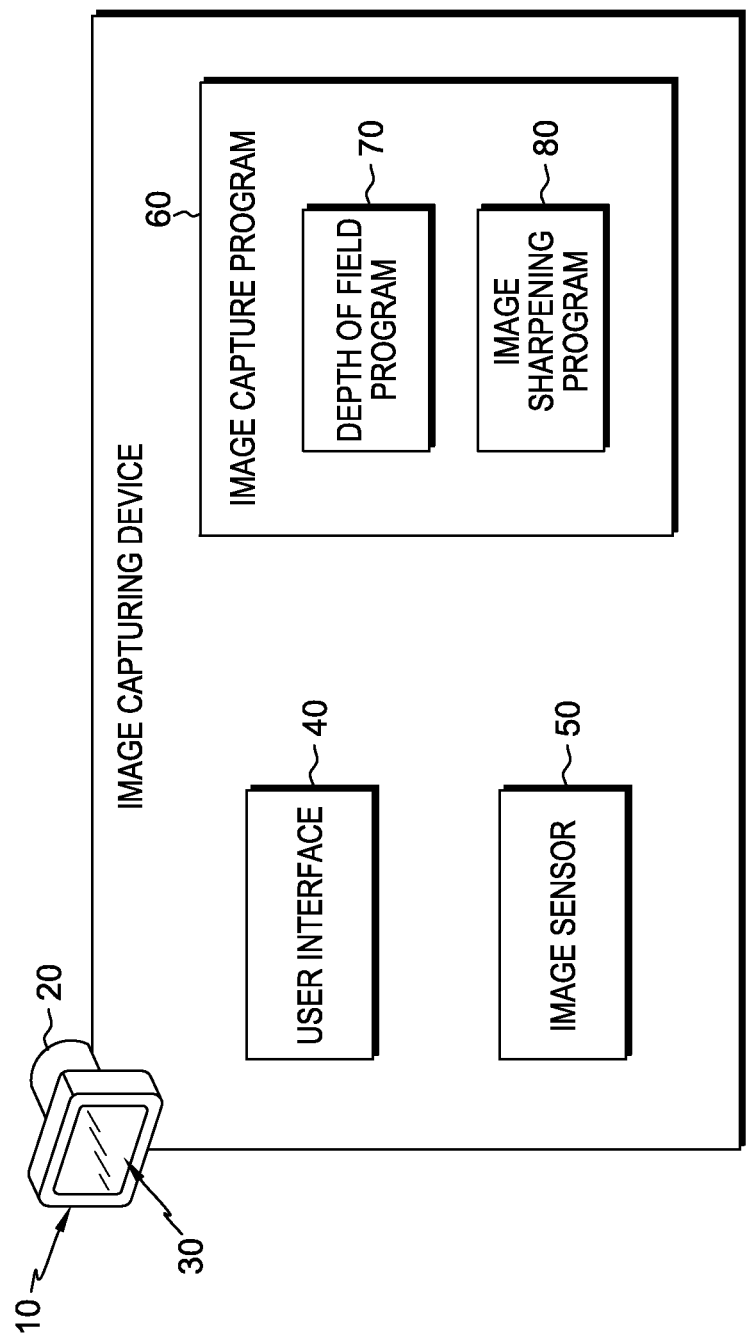
FIG. 1 is a functional block diagram of an image capturing device, in accordance with one embodiment of the present invention.

The present invention will now be described in detail with reference to the Figures. FIG. 1 is a functional block diagram of image capturing device 10, in accordance with one embodiment of the present invention. FIG. 1 provides only an illustration of one embodiment and does not imply any limitations with regard to the environments in which different embodiments may be implemented.

In the depicted embodiment, image capturing device 10 is a computing device integrated with an imaging device. For example, image capturing device 10 can be a digital camera, such as a digital single lens reflex camera (dSLR), having computer processing capabilities or, alternatively, an imaging device in communication with a separate distinct computing device. In other embodiments, image capturing device 10 may be a digital video camera, a computer with an integrated digital camera, a smart phone equipped with a digital camera, or any programmable electronic device capable of capturing and displaying digital images. Digital images may be still photographs or moving images such as videos or movies. Image capturing device 10 includes optical lens 20, display 30, user interface (UI) 40, image sensor 50, image capture program 60, and depth of field program 70. Image capturing device 10 may include internal and external components as depicted in further detail with respect to FIG. 4.

Optical lens 20 is integrated with image capturing device 10. In one embodiment, optical lens 20 is an interchangeable dSLR lens. For example, optical lens 20 may be a 30 mm interchangeable dSLR lens. In another embodiment, optical lens 20 may be permanently fixed to image capturing device 10. For example, optical lens 20 is permanently fixed when image capturing device 10 is a digital point-and-shoot camera. Optical lens 20 operates to focus light onto image sensor 50.

The aperture (not shown) is the opening through which light travels through optical lens 20 and into image capturing device 10. The aperture may be located in different locations within optical lens 20. For example, the aperture may be a ring or other fixture that holds an optical element in place, or it may be a diaphragm placed in the optical path to limit the amount of light that passes through the lens. The aperture may be adjusted to control the amount of light entering image capturing device 10.

Display 30 is connected to image capturing device 10. In one embodiment, display 30 is a liquid crystal display (LCD) fixed to image capturing device 10. In another embodiment, display 30 is a display monitor connected to a computer with an integrated digital camera. In another embodiment, display 30 is a display monitor connected to a network. In yet another embodiment, display 30 is a monitor attached to image capturing device 10 via a cable. Display 30 operates to display a digital image captured by image capturing device 10. A digital image is comprised of a set of pixels. A pixel is a physical point in an image. It is the smallest addressable element in a display device, and so it is the smallest controllable element of a picture represented on the screen. Pixels are typically closely packed and arranged in rows and columns.

In one embodiment, a digital image may be a still image. In another embodiment, a digital image may be a digital video.

UI 40 operates on image capturing device 10 and works in conjunction with display 30 to visualize content such as images captured by image capturing device 10. UI 40 may comprise one or more interfaces such as an operating system interface and application interfaces. In one embodiment, UI 40 comprises an interface to image capture program 60, depth of field program 70, and image sharpening program 80. In one embodiment, UI 40 receives an image captured by image capturing program 60 and sends the image to display 30.

Image sensor 50 is integrated with image capturing device 10. Image sensor 50 is a detector that converts an optical image into an electronic signal. The electrical signals are quantized by an analog-to-digital (A/D) converter (not shown). In one embodiment, image sensor 50 may be a charge-coupled device (CCD) sensor. In another embodiment, image sensor 50 may be a complementary metal-oxide semiconductor (CMOS) sensor or another type of sensor. In yet another embodiment, image sensor 50 could be a specialized sensor for medical imaging. In another embodiment, image sensor 50 converts invisible electromagnetic radiation into an electronic signal.

In one embodiment, light passes through optical lens 20 and reaches image sensor 50, which may contain an array of pixel sensors evenly distributed across image sensor 50. A pixel sensor may be comprised of a semiconductor material that absorbs light photons and generates electronic signals. In one embodiment, image sensor 50 may also contain autofocus pixel sensors. The autofocus pixel sensors may be an array of pixel sensors that is arranged in various patterns. In another embodiment, the autofocus pixel sensors may be contained on a sensor that is separate from image sensor 50.

Image capture program 60 is a standard image capture program. For example, image capture program 60 is a program operating on a digital camera, such as Nikon® Scene Recognition System. In one embodiment, image capture program 60 receives electronic signals from image sensor 50.

In one embodiment, image capture program 60 also manages autofocus capabilities of image capturing device 10. Autofocus capabilities utilize one or more autofocus pixel sensors to determine if the image is in focus and electromechanically adjusts the focus of image capturing device 10 if the image is not in focus. A user may use UI 40 to operate image capture program 60 to select one or more focus points to set the photographer's focus point in the field of view of image capturing device 10. A focus point is a location in the field of view of image capture device 10 associated with an autofocus pixel sensor. Image capture program 60 may then determines if the subject matter at the single focus point is in focus. If the subject matter at the single focus point is not in focus, then image capture program 60 electromechanically adjusts the focus until the subject matter is in focus.

If the autofocus program utilizes active autofocus, image capturing program 60 may use ultrasonic waves or triangulation of infrared light to determine the distance between the subject and image sensor 50. Active autofocus is a type of autofocus that determines correct focus by measuring distance to the subject independently of the optical system. In one embodiment, an ultrasonic wave detector (not shown) may be used to determine distance. In another embodiment, an infrared light detector (not shown) may be used to determine distance. In yet another embodiment, another method may be used to determine distance. If the autofocus program utilizes passive autofocus, image capture program 60 may use phase detection or contrast measurement to determine focus. Passive autofocus is a type of autofocus that determines correct focus by performing a passive analysis of the image that is entering the optical system. In one embodiment, image capture program 60 may be able to detect motion of the subject matter toward or away from the camera while maintaining focus on the subject matter.

In one embodiment, phase detection may also determine distance between the subject matter at a focus point and an autofocus pixel sensor associated with the focus point. Phase detection may function in a way similar to a rangefinder, which is a focusing mechanism that allows the user to measure the distance to the subject matter. A rangefinder shows two identical images. One image moves when a calibrated wheel on the image capturing device is turned. After the two images overlap and fuse into one, the distance is read off the calibrated wheel. For example, when utilizing phase detection imaging device 10 contains a beam splitter (not shown) that captures light from opposite sides of the lens and diverts light to autofocus sensors located separately from image sensor 50. This generates two separate images which are compared for light intensity and separation error in order to determine whether the image is in or out of focus. During this comparison, phase detection is used to determine the distance between the subject matter at a focus point to the associated autofocus pixel sensor. For example, digital cameras measure distance to the subject matter electronically.

Image capture program 60 sends the raw image to UI 40 for display on display 30. A raw image file contains minimally processed data from the image sensor of a digital image capturing device. A raw image is usually compressed before storage, editing, and/or printing. In one embodiment, image capture program 60 sends raw image to depth of field program 70. In another embodiment, image capture program 60 sends image data to image sharpening program 80. Image data, such as depth of field, may be calculated from other data such as aperture diameter, sensor size, and focal length of optical lens 20, or it may be obtained by other manual or automatic methods during or after image acquisition. Image data also includes the distance between a subject at a focus point and an autofocus pixel sensor associated with the focus point by using the autofocus capabilities of image capture program 60. Image data also includes distances between image capturing device 10 and a plurality of focus points. In the depicted embodiment, image capture program 60 also operates to send image data to depth of field program 70.

Depth of field program 70 operates to visualize the depth of field of an image captured by image capture program 60. In one embodiment, depth of field program 70 receives image data from image capture program 60. Depth of field program 70 determines the depth of field of the captured image based on the image data. Depth of field program 70 may display the depth of field in UI 40 of image capturing device 10. In one embodiment, depth of field program 70 creates a depth map for the image. For example, depth of field program 70 creates a depth map that overlays a mask of varying transparency over an image to distinguish between areas that are inside the depth of field and areas that are outside the depth of field. In such an example, depth of field program 70 may overlay an opaque mask over areas that are in the foreground of the image and a semi-transparent mask over focus points that are in the background of the image.

In another embodiment, depth of field program 70 may overlay a mask of varying colors or patterns over an image in order to distinguish between areas that are inside the depth of field and areas that are outside the depth of field. For example, depth of field program 70 may overlay a blue mask over areas that are in the foreground of the image and a red mask over focus points that are in the background of the image, or depth of field program 70 may overlay areas inside the depth of field with a yellow mask. In this example, focus points that are inside the depth of field are not masked.

In one embodiment, depth of field program 70 sends depth maps to image capturing program 60. In another embodiment, depth of field program 70 sends depth maps to image sharpening program 80. As depicted, depth of field program 70 is a sub-program or routine of image capture program 60. In another embodiment, depth of field program 70 may be an independent program capable of communicating with image capture program 60 and image sharpening program 80.

Image sharpening program 80 operates to sharpen the contents of a raw image captured by image capturing device 10. In one embodiment, image sharpening program 80 receives image data for the raw image, including a depth map, from depth of field program 70. Image sharpening program 80 may use the depth map to determine areas of the captured image that are in focus. In one embodiment, image sharpening program 80 applies sharpening to focus points of the captured image that are in focus. In another embodiment, image sharpening program 80 prompts the user to select focus points for sharpening, and applies sharpening to the selected focus points. In yet another embodiment, image sharpening program 80 receives an instruction to repeat sharpening of a captured image with previously sharpened focus points.

As depicted, image sharpening program 80 is a sub-program or routine of image capture program 60. In another embodiment, image sharpening program 80 may be an independent program capable of communicating with image capture program 60.

Figure 2A:
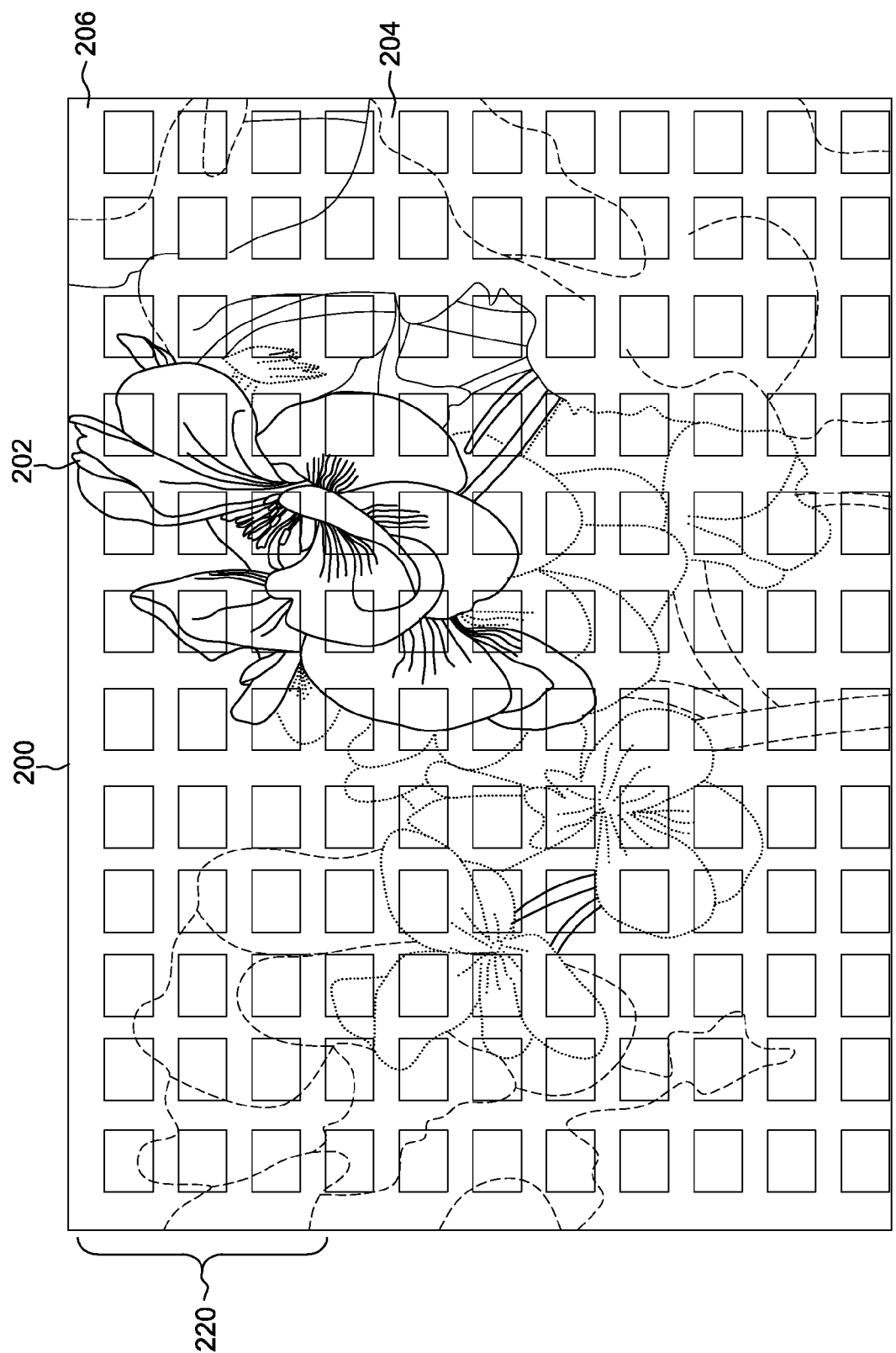
FIG. 2A is an exemplary view of a user interface for an image capturing program of the image capturing device of FIG. 1, in accordance with one embodiment of the present invention.
Figure 2B:
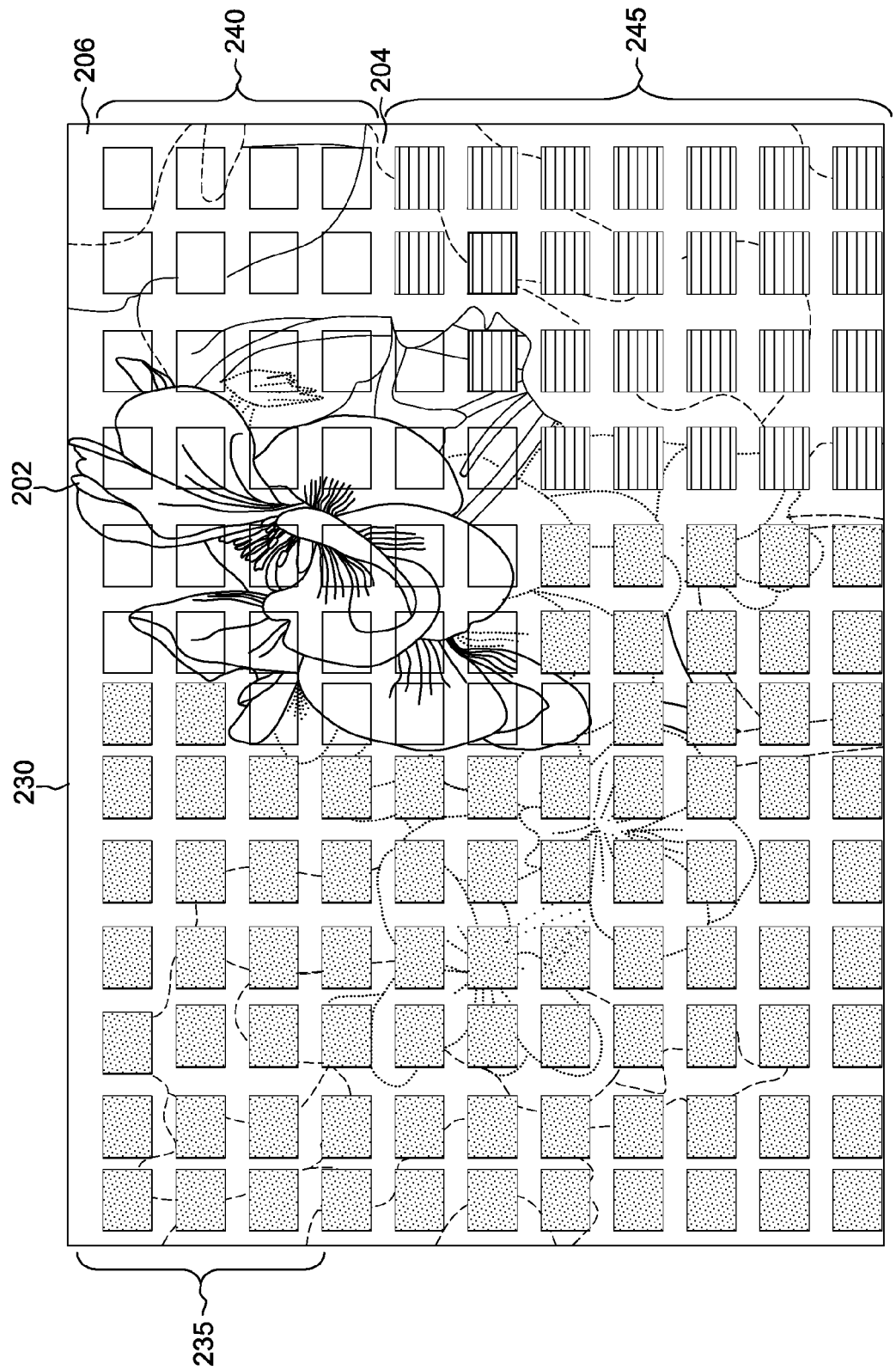
FIG. 2B is an illustration of the user interface as affected by a depth of field program, in accordance with one embodiment of the present invention.
Figure 2C:
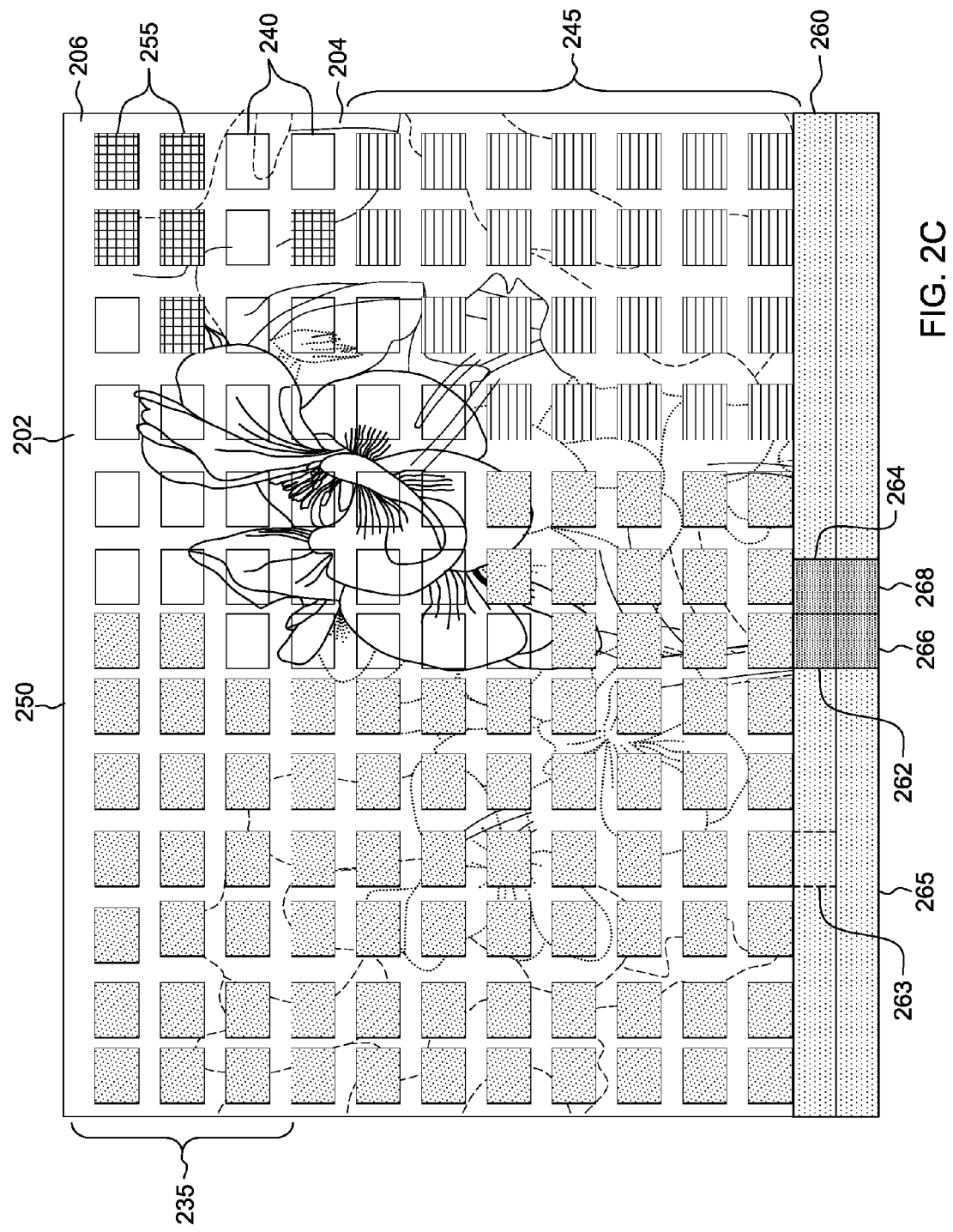
FIG. 2C is an exemplary view of the user interface as affected by an image sharpening program, in accordance with one embodiment of the present invention.

FIGS. 2A-2C depict exemplary views of UI 40 for image capture program 60, depth of field program 70, and image sharpening program 80, in accordance with one embodiment of the present invention. UI 200 of FIG. 2A, UI 230 of FIG. 2B, and UI 250 of FIG. 2C are each examples of UI 40 of FIG. 1 and, in the depicted embodiment, allow a user to see content displayed by image capture program 60, depth of field program 70, and image sharpening program 80. In some embodiments, the steps depicted by FIGS. 2A-2C may be automatically performed by program image sharpening program 80.

In one embodiment, initially, a user operating image capturing device 10 positions image capturing device 10 facing a subject matter to be captured in an image. The user, using UI 40, captures a raw image of an object. Image capture program 60 receives image data for the raw image.

FIG. 2A depicts a display of UI 200 depicting image capture program 60 operating on image capturing device 10. UI 200 displays a preview of a raw image received from image capture program 60. The image includes objects 202, 204, and 206. In the depicted illustration, objects 202 and 204 are in the focal plane and are in focus. Object 206 is partially in focus. The remaining objects in the image are out of the focal plane and appear blurry. Focus points 220 are locations in the field of view of image capturing device 10. Each focus point of focus points 220 is associated with an autofocus pixel sensor. Each of the square focus points shown in FIG. 2A is included with focus points 220.

FIG. 2B depicts a display of UI 230 when depth of field program 70 is operating on image capturing device 10. The image shown in UI 230 is the same image shown in UI 200 of FIG. 2A. UI 230 displays the raw image received from image capture program 60 and depth of field program 70, operating on the raw image, determines that the subject matter associated with focus points 235 (as indicated by a first mask, which is shown as spotted) and focus points 245 (as indicated by a second mask, which is shown as striped) are out of the focal plane. Depth of field program 70 determines that focus points 235 (indicated by the spotted first mask) each correspond to subject matter in the background of the image that is out of focus. Depth of field program 70 applies a first mask to focus points 235. Depth of field program 70 determines that focus points 245 (indicated by the striped second mask) each correspond to subject matter in the foreground of the image and are therefore out of focus. Depth of field program 70 applies a second mask to focus points 245. Depth of field program 70 sends image data, including the depth map, to image sharpening program 80.

FIG. 2C depicts a display of UI 250 when image sharpening program 80 is operating on image capturing device 10. In the depicted embodiment, UI 250 displays the raw image and depth map received from depth of field program 70. The image shown in UI 250 is the same image shown in UI 200 of FIG. 2A and UI 230 of FIG. 2B.

Image sharpening program 80 determines that focus points 235 (as indicated by a spotted mask), and focus points 245 (as indicated by a striped mask), have respective corresponding depth map masks. In one embodiment, image sharpening program 80 uses the depth map received from depth of field program 70 to determine that focus points 235 and focus points 245 are out of focus. Image sharpening program 80 determines that focus points 240, which are unmasked, are in focus. Image sharpening program 80 applies sharpening to focus points 240.

In the depicted embodiment (FIG. 2C), UI 250 includes slide bar 260 and slide bar 265. Slide bar 260 includes slider 262 and slider 264. In yet another embodiment, the user manually selects focus points for customized sharpening. In the depicted embodiment, slider 262 and slider 264 are positioned towards the center of slide bar 260. Slider 262 and slider 264 can be positioned on slide bar 260 to indicate a range for sharpening. For example, the range of sharpening is neutral when slider 262 and slider 264 are positioned together (i.e. so that they are touching each other) anywhere on slide bar 260. When slider 262 and slider 264 are both in this neutral position, no focus points are selected. In one embodiment, the user selects a neutral location. For example, the user may initially position sliders 262 and 264 together toward the center of slider bar 260, as shown in FIG. 2C, to create a neutral position. If the user, using UI 40, then moves slider 262 to the left, all focus points that are in focus or partially in focus located between that neutral position and the new position of slider 262 are selected for sharpening. Specifically, for example, if the neutral position is toward the center of slide bar 260 (as shown in FIG. 2C) and the user moves slider 262 is moved to position 263, then the four columns of focus points between the neutral position and position 263 are selected for sharpening. If slider 264 is moved to the right, all focus points between the neutral position and the new position of slider 264 are selected for sharpening.

In another embodiment, the user may move slide bar 260 within UI 250. For example, the user moves slide bar 260 so that it is oriented vertically on the left side of UI 250. In another example, the user moves slide bar 260 so that it is oriented horizontally at the top of UI 250.

Slide bar 265 includes slider 266 and slider 268. Slider 266 and slider 268 are located in the center of slide bar 265, depicted horizontally in FIG. 2C. In another embodiment, slide bar 265 is oriented vertically, such as slide bar 265 being positioned on the left side of the image, extending vertically. Sliders 266 and 268 on slide bar 265, are used to apply a strength of sharpening to focus points selected by corresponding sliders 262 and 264, on slider bar 260. Focus points may be manually selected for customized sharpening. Sliders 262 and 264 on slide bar 260, may be used to select focus points. Sliders 266 and 268 on slide bar 265, may be used to manually indicate the strength of sharpening to apply to. In one embodiment, the selected focus points. The strength of sharpening is neutral when a user positions slider 266 and slider 268 on slide bar 265 in a neutral position toward the center of slide bar 265, as previously described. If the neutral position is toward the center of slide bar 265 (as shown in FIG. 2C) moves slider 266 indicates the strength of sharpening applied to the four columns of focus points selected by slider 262. If slider 266 is moved to the left, then sharpening is applied to focus points on the left side of the image that are indicated by slider 262. As slider 266 continues to be moved to the left, the strength of sharpening of the selected focus points increases. As slider 266 is moved to the right, the strength of sharpening of the selected focus points decreases. When slider 266 is in neutral position, no sharpening is applied to the focus points on the left side of the image.

In one embodiment, slider 268 is used to apply sharpening to focus points on the right side of the image that are selected by slider 264. For example, if the user, using UI 40, moves slider 268 to the right, sharpening is applied to focus points on the right side of the image that are indicated by slider 264. As the user moves slider 268 to the right, the strength of sharpening of the selected focus points increases. As the user moves slider 268 to the left, the strength of sharpening of the selected focus points decreases. When slider 268 is in neutral position, no sharpening is applied to the focus points on the right side of the image. When slider 266 and slider 268 are both in neutral position, no sharpening is applied to the image.

In another embodiment, the user may move slide bar 265 within UI 250. For example, the user moves slide bar 265 so that it is oriented vertically on the left side of UI 250. In another example, the user moves slide bar 265 so that it is oriented horizontally at the top of UI 250.

In one embodiment, image sharpening program 80 applies sharpening to selected focus points that are in focus or partially in focus.

In one embodiment, image sharpening program 80 sends a preview of the selected sharpening visualized in real time to display 30 as the user interacts with slide bar 260 and slide bar 265. Image sharpening program 80 prompts the user to accept or reject the sharpening settings indicated by slide bar 260 and slide bar 265. For example, image sharpening program 80 displays a modeless window that prompts the user to accept or reject the selected settings. A modeless window is a window that does not require a user to interact with it before the user can return to operating a parent application (e.g. image sharpening program 80). The user can, for example, continue to interact with image capture program 60, depth of field program 70, image sharpening program 80, or any other program on image capturing device 10 while the modeless window is open. In one embodiment, the user, using UI 40, accepts the sharpening settings and image sharpening program 80 applies the selected sharpening settings to the image.

Figure 3:
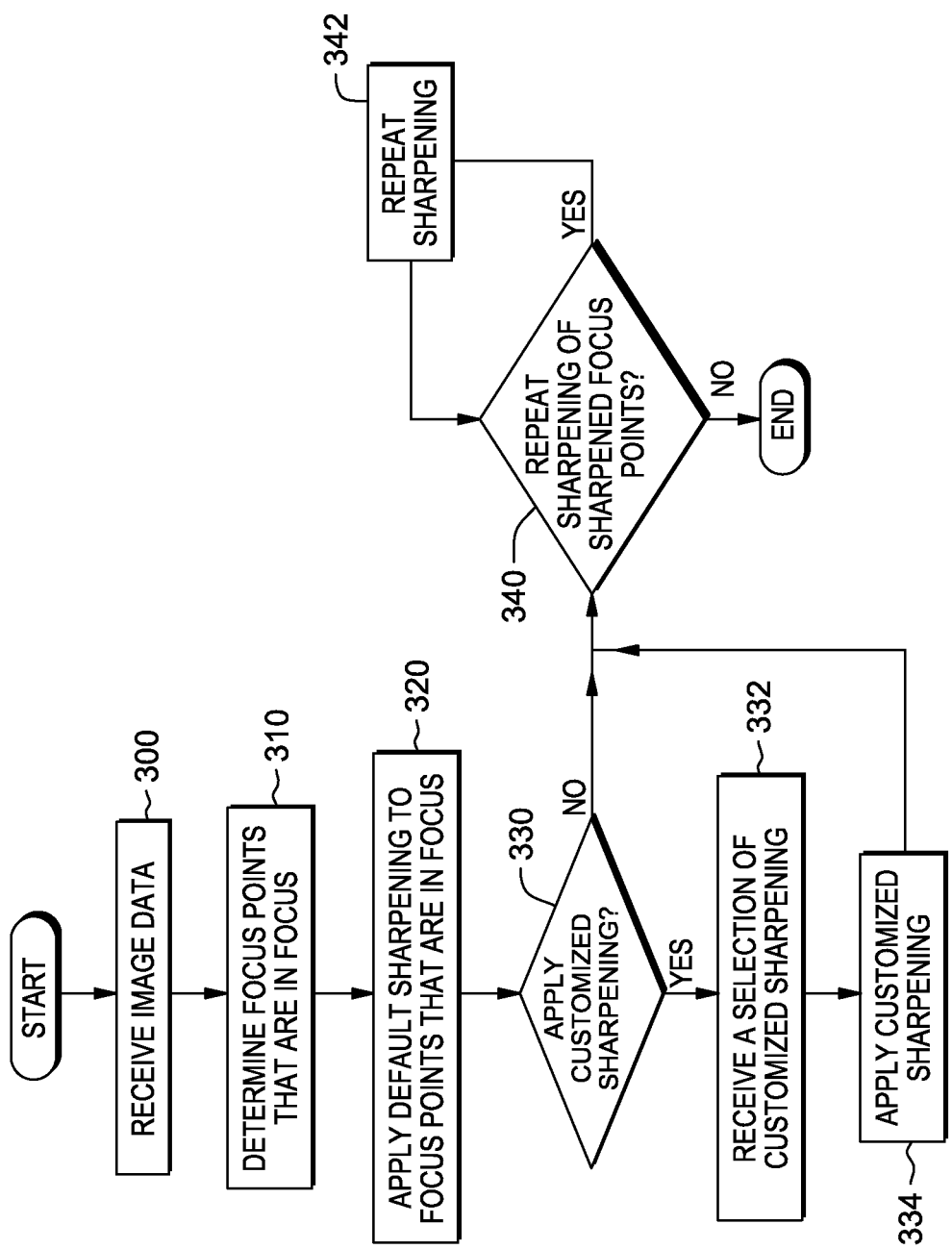
FIG. 3 is a flowchart depicting the steps of the image sharpening program, in accordance with one embodiment of the present invention.

FIG. 3 is a flowchart depicting operational steps of image sharpening program 80 for sharpening a raw image captured by image capturing device 10, in accordance with one embodiment of the present invention.

In one embodiment, initially, a user positions image capturing device 10 such that image capturing device 10 is facing subject matter to be captured in an image. The user, using image capturing device 10, captures an image of the subject matter. In capturing the image, light passes through optical lens 20. Image sensor 50 then absorbs the light, converts it into an electronic signal, and sends the signal to image capture program 60. Image capture program 60 receives the electronic signal from image sensor 50. Image capture program 60 adjusts autofocus to bring the subject matter into focus. Image capture program 60 determines a distance between subject matter at a focus point automatically selected by image capture program 60 and an autofocus pixel sensor associated with the focus point.

Image capture program 60 receives image data. In one embodiment, image capture program 60 sends image data to depth of field program 70. Depth of field program 70 receives image data from image capture program 60. Depth of field program 70 creates a depth map. The depth map indicates specific pixels of the captured image that are out of focus. In one embodiment, depth of field program 70 sends image data, including the depth map, to image sharpening program 80. In another embodiment, depth of field program 70 sends the depth map to image capture program 60. Image capture program 60 receives the depth map and sends image data, including the depth map, to image sharpening program 80. In another embodiment, image capture program 60 stores image data, including the depth map, in a storage repository.

In step 300, image sharpening program 80 receives image data for the raw image captured by image capturing device 10. In one embodiment, image sharpening program 80 receives image data from image capture program 60. In another embodiment, image sharpening program 80 receives image data from depth of field program 70. In yet another embodiment, image sharpening program 80 may access raw image data stored by image capture program 60. For example, image sharpening program 80 accesses a storage repository that includes image data stored by image capture program 60. Image data includes a depth map created by depth of field program 70 for the raw image captured by image capturing device 10.

In step 310, image sharpening program 80 determines focus points that are in focus. In one embodiment, image sharpening program 80 uses the depth map received from depth of field program 70 to determine focus points that are in focus. For example, image sharpening program 80 may determine that focus points not masked by the depth map are in focus. In another embodiment, image sharpening program 80 receives an indication, from depth of field program 70, of focus points that are in focus.

In step 320, image sharpening program 80 applies default sharpening to focus points that are in focus. In one embodiment, image sharpening program 80 applies a sharpening mask to the focus points that are in focus. For example, the sharpening mask may exaggerate the difference in brightness along the edges of objects associated with the focus points that are in focus. In another example, image sharpening program 80 may create a copy of the original image and blur sections of the copy. Image sharpening program 80 may overlay the original image over the copy of the image. Image sharpening program 80 may calculate the difference in tonal values, or lightness, between the original and blurred images.

In one embodiment, image sharpening program 80 adjusts the radius of the applied sharpening mask. The size of the radius determines how wide of an area, around a particular edge, will be sharpened. For example, if image sharpening program 80 uses a small radius, then sharpening will be applied only to areas that are close to the edge. In another example, if image sharpening program 80 uses a large radius, then sharpening will be applied to areas further from the edge. Image sharpening program 80 uses the radius setting to determine the degree of blurring of the image copy.

In another embodiment, image sharpening program 80 adjusts the threshold of the applied sharpening mask. Threshold settings may be used to prevent sharpening of areas that have little tonal difference, or contrast. Threshold settings are also useful for preventing sharpening of noise in an image. In one embodiment, threshold settings may determine how much tonal difference must exist between two pixels before sharpening is applied (on a 0 to 255 scale). In such an embodiment, a threshold setting of 0 means that almost any tonal difference in the image will be sharpened. Larger threshold settings, in such an embodiment, will result in sharpening of areas that have large tonal differences between pixels of the image. For example, a threshold setting of 5 will result in sharpening of adjacent pixels that have a tonal difference of 5 levels or more.

Image sharpening program 80 determines if customized sharpening will be applied to the raw image (decision step 330). In one embodiment, image sharpening program 80 prompts the user to indicate if customized sharpening will be applied. For example, image sharpening program 80 may display a modeless window. If image sharpening program 80 receives an indication that customized sharpening will be applied to the raw image, then image sharpening program 80 proceeds to step 332 (decision 330, Yes branch). If image sharpening program 80 receives an indication that customized sharpening will not be applied to the raw image, then image sharpening program 80 proceeds to decision 340 (decision 330, No branch).

In step 332, image sharpening program 80 receives a selection of customized sharpening. In one embodiment, the user, using UI 40, selects individual focus points to be sharpened, and indicates the strength of sharpening to be applied to the selected focus points. For example, a user may use a slider bar to select focus points. In such an example, the user may use another slider bar to select the strength of sharpening to be applied to the selected focus points, such as in FIG. 2C. In yet another example, the user, using UI 40, may manually select focus points for sharpening. In such an example, the user, using UI 40, may also manually enter a sharpening strength for the selected focus points.

In step 334, image sharpening program 80 applies customized sharpening. In one embodiment, image sharpening program 80 applies a sharpening mask to the focus points selected for customized sharpening. In one embodiment, image sharpening program 80 applies customized sharpening similar to that as described in step 320 for default sharpening.

Image sharpening program 80 determines if the sharpened focus points will be sharpened again (decision step 340). For example, the user may choose to repeat sharpening of focus points that have already been sharpened. The method of repeated sharpening to one area of an image is known as multipass sharpening. Multipass sharpening may sharpen one are of an image two or more times using a different sharpening technique each time. In one embodiment, image sharpening program 80 uses a combination of sharpening methods described in step 320. In another embodiment, image sharpening program 80 uses another type of sharpening method.

In one embodiment, image sharpening program 80 prompts the user to indicate if the user wants to repeat sharpening of the sharpened focus points. For example, image sharpening program 80 displays a modeless window that prompts the user to indicate if sharpened focus points will be sharpened again. If the user indicates that the sharpened focus points will not be sharpened again, then image sharpening program 80 ends (decision 340, No branch). If the user indicates that image the sharpened focus points will be sharpened again, then image sharpening program 80 proceeds to step 342 (decision 340, Yes branch). In another embodiment, image sharpening program 80 automatically determines that the sharpened focus points are not in focus. Image sharpening program 80 automatically repeats sharpening of sharpened focus points that are not in focus.

In step 342, image sharpening program 80 repeats sharpening. In one embodiment, image sharpening program 80 applies a sharpening mask to the sharpened focus points. In another embodiment, image sharpening program 80 adjusts the radius of the applied sharpening mask. In yet another embodiment, image sharpening program 80 adjusts the threshold of the applied sharpening mask. In another embodiment, image sharpening program 80 receives an instruction indication to repeat sharpening more than once.

Figure 4:
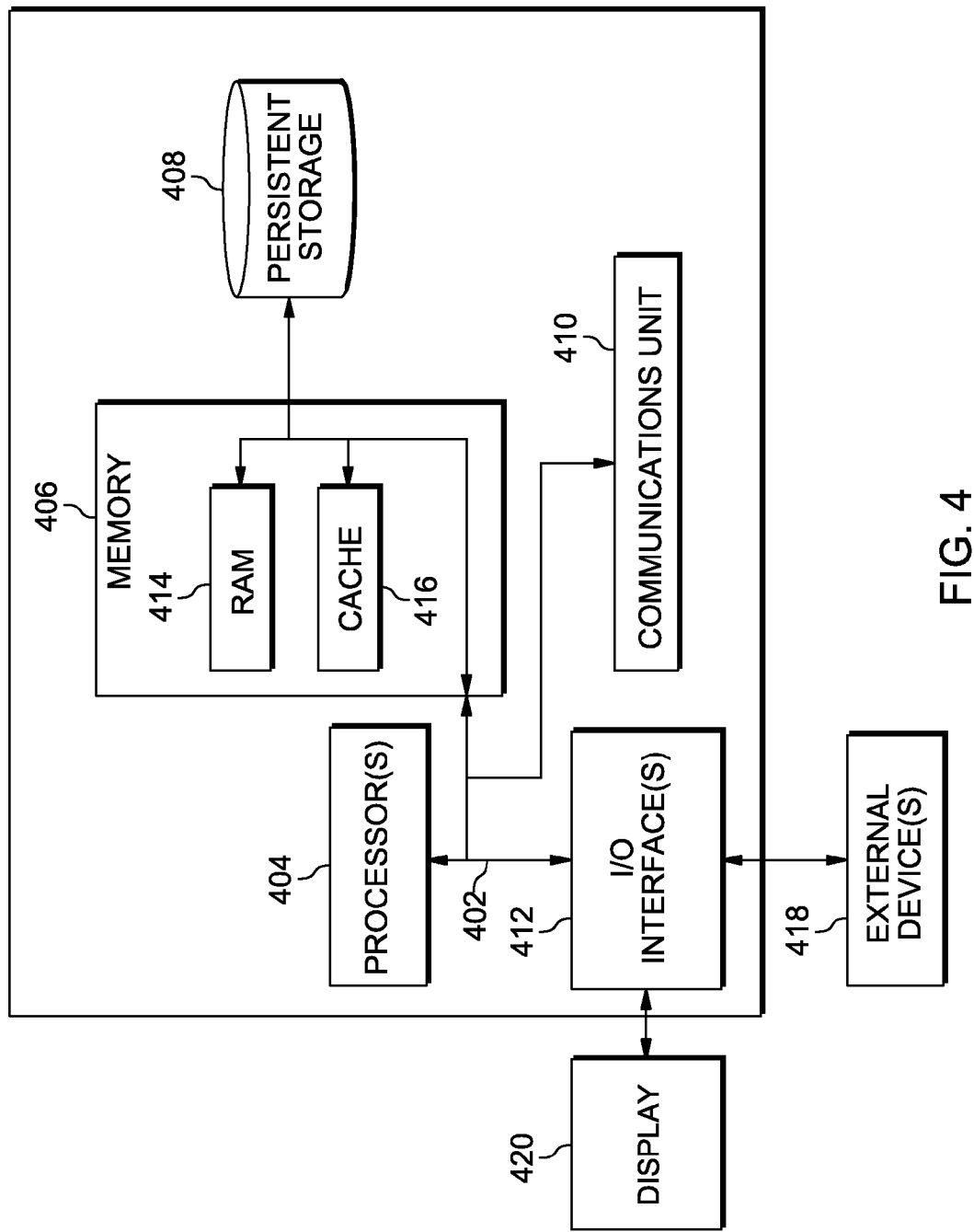
FIG. 4 depicts a block diagram of components of the image capturing device of FIG. 1, in accordance with one embodiment of the present invention.

FIG. 4 depicts a block diagram of components of image capturing device 10 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Image capturing device 10 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

UI 40, image capture program 60, depth of field program 70, and image sharpening program 80 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other servers. In these examples, communications unit 410 includes one or more network interface cards. Communications unit 410 may provide communications through the use of either or both physical and wireless communications links. UI 40, image capture program 60, depth of field program 70, and image sharpening program 80 may be downloaded to persistent storage 408 through communications unit 410.

I/O interface(s) 412 allows for input and output of data with other devices that may be connected to image capturing device 10. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., UI 40, image capture program 60, depth of field program 70, and image sharpening program 80, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In another embodiment, the invention provides a method that performs the process of the invention on a subscription, advertising, and/or fee basis. That is, a service provider, such as a Solution Integrator, could offer to provide sharpening of an image functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for sharpening of an image. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

A method for sharpening an image in a networked computing environment. The method includes receiving a raw digitized image. The method further includes identifying, by one or more processors, a first set of one or more focus points of the raw digitized image that are in focus, wherein the first set of one or more focus points are associated with a first area comprising a first portion of the raw digitized image. The method further includes applying, by one or more processors, sharpening of a first sharpening strength to the first set of one or more focus points of the raw digitized image that are in focus.

What is claimed is:

1. A method for sharpening an image, the method comprising the steps of:
    receiving a raw digitized image;
    identifying, by one or more processors, a first set of one or more focus points of the raw digitized image that are in focus, wherein the first set of one or more focus points are associated with a first area of the raw digitized image;
    causing, by one or more processors, a depth map to be displayed, wherein the depth map comprises at least the raw digitized image and a mask, wherein the mask indicates a second set of one or more focus points of the raw digitized image within a first depth of field threshold;
    receiving a selection of the mask and a second sharpening strength;
    applying, by one or more processors, sharpening of a first sharpening strength to the first set of one or more focus points of the raw digitized image that are in focus; and
    applying, by one or more processors, sharpening of the second sharpening strength to the second set of one or more focus points of the raw digitized image, based on the selection of the mask.

2. The method of claim 1, further comprising:
    identifying, by one or more processors, a third set of one or more focus points of the raw digitized image within a second depth of field threshold, wherein the third set of one or more focus points are associated with a second area of the raw digitized image; and
    applying, by one or more processors, sharpening of a third sharpening strength to the third set of one or more focus points of the raw digitized image within the second depth of field threshold.

3. The method of claim 1, wherein the second sharpening strength is greater than the first sharpening strength.

4. The method of claim 1, further comprising:
receiving a selection of a third area and a second sharpening strength, wherein the second area is associated with a third set of one or more focus points; and
applying, by one or more processors, the third sharpening strength to the third set of one or more focus points of the raw digitized image.

5. The method of claim 1, further comprising:
causing, by one or more processors, the sharpened raw digitized image to be displayed;
receiving an indication to further sharpen the first set of one or more focus points of the raw digitized image that is in focus; and
responsive to the indication to further sharpen the first set of one or more focus points, applying, by one or more processors, a second sharpening to the first set of one or more focus points of the raw digitized image that is in focus.

6. The method of claim 1, wherein the first sharpening strength is selected by a user.

7. A computer program product for sharpening an image, the computer program product comprising:
one or more computer readable storage media and program instructions stored on the one or more computer readable storage media, the program instructions comprising:
program instructions to receive a raw digitized image;
program instructions to identify a first set of one or more focus points of the raw digitized image that are in focus, wherein the first set of one or more focus points are associated with a first area comprising a first portion of the raw digitized image;
program instructions to cause a depth map to be displayed, wherein the depth map comprises at least the raw digitized imagine and a mask, wherein the mask indicates a second set of one or more focus points of the raw digitized image within a depth of field threshold;
program instructions to receive a selection of the mask and a second sharpening strength;
program instructions to apply sharpening of a first sharpening strength to the first set of one or more focus points of the raw digitized image that are in focus; and
program instructions to apply sharpening of the second sharpening strength to the second set of one or more focus points of the raw digitized image, based on the selection of the mask.

8. The computer program product of claim 7, further comprising:
program instructions, stored on the one or more computer readable storage media, to identify a third set of one or more focus points of the raw digitized image within a second depth of field threshold, wherein the third set of one or more focus points are associated with a second area comprising a second portion of the raw digitized image; and
program instructions, stored on the one or more computer readable storage media, to apply sharpening of a third sharpening strength to the third set of one or more focus points of the raw digitized image within the second depth of field threshold.

9. The computer program product of claim 7, wherein the second sharpening strength is greater than the first sharpening strength.

10. The computer program product of claim 7, further comprising:
program instructions, stored on the one or more computer readable storage media, to receive a selection of a second area and a third sharpening strength, wherein the second area is associated with a third set of one or more focus points; and
program instructions, stored on the one or more computer readable storage media, to apply the third sharpening strength to the third set of one or more focus points of the raw digitized image.

11. The computer program product of claim 7, further comprising:
program instructions, stored on the one or more computer readable storage media, to cause the sharpened raw digitized image to be displayed;
program instructions, stored on the one or more computer readable storage media, to receive an indication to further sharpen the first set of one or more focus points of the raw digitized image that is in focus; and
responsive to the indication to further sharpen the first set of one or more focus points, program instructions, stored on the one or more computer readable storage media, to apply a second sharpening to the first set of one or more focus points of the raw digitized image that is in focus.

12. The computer program product of claim 7, wherein the first sharpening strength is selected by a user.

13. A computer system for sharpening an image, the computer system comprising:
one or more computer processors;
one or more computer readable storage media;
program instructions stored on the computer readable storage media for execution by at least one of the one or more processors, the program instructions comprising:
program instructions to receive a raw digitized image;
program instructions to identify a first set of one or more focus points of the raw digitized image that are in focus, wherein the first set of one or more focus points are associated with a first of the raw digitized image;
program instructions to cause a depth map to be displayed, wherein the depth map comprises at least the raw digitized image and a mask, wherein the mask indicates a second set of one or more focus points of the raw digitized image within a depth of field threshold;
program instructions to receive a selection of the mask and a second sharpening strength;
program instructions to apply sharpening of a first sharpening strength to the first set of one or more focus points of the raw digitized image that are in focus, and program instructions to apply sharpening of the second sharpening strength to the second set of one or more focus points of the raw digitized image, based on the selection of the mask.

14. The computer system of claim 13, further comprising:
program instructions, stored on the computer readable storage media for execution by at least one of the one or more processors, to identify a third set of one or more focus points of the raw digitized image within a second depth of field threshold, wherein the third set of one or more focus points are associated with a second area of the raw digitized image; and
program instructions, stored on the computer readable storage media for execution by at least one of the one or more processors, to apply sharpening of a third sharpening strength to the third set of one or more focus points of the raw digitized image within the second depth of field threshold.

15. The computer system of claim 13, wherein the second sharpening strength is greater than the first sharpening strength.

16. The computer system of claim 13, further comprising:
program instructions, stored on the computer readable storage media for execution by at least one of the one or more processors, to receive a selection of a second area and a third sharpening strength, wherein the second area is associated with a third set of one or more focus points; and program instructions, stored on the computer readable storage media for execution by at least one of the one or more processors, to apply the third sharpening strength to the third set of one or more focus points of the raw digitized image.

17. The computer system of claim 13, further comprising:
program instructions, stored on the computer readable storage media for execution by at least one of the one or more processors, to cause the sharpened raw digitized image to be displayed;

program instructions, stored on the computer readable storage media for execution by at least one of the one or more processors, to receive an indication to further sharpen the first set of one or more focus points of the raw digitized image that is in focus; and responsive to the indication to further sharpen the first set of one or more focus points, program instructions, stored on the computer readable storage media for execution by at least one of the one or more processors, to apply a second sharpening to the first set of one or more focus points of the raw digitized image that is in focus.

* * * * *